(12) United States Patent
Saini et al.

(10) Patent No.: US 12,079,240 B2
(45) Date of Patent: Sep. 3, 2024

(54) METHOD AND SYSTEM FOR MANAGING ITEMS IN WAREHOUSES THROUGH DISTRIBUTED LEDGER

(71) Applicant: HCL Technologies Limited, New Delhi (IN)

(72) Inventors: Navin Saini, Noida (IN); Yogesh Gupta, Noida (IN)

(73) Assignee: HCL Technologies Limited, New Delhi (IN)

( * ) Notice: Subject to any disclaimer, the term of this patent is extended or adjusted under 35 U.S.C. 154(b) by 33 days.

(21) Appl. No.: 17/704,049

(22) Filed: Mar. 25, 2022

(65) Prior Publication Data

US 2022/0318266 A1     Oct. 6, 2022

(51) Int. Cl.
| | | |
|---|---|---|
| G06F 16/27 | (2019.01) | |
| G06F 16/215 | (2019.01) | |
| G06Q 10/087 | (2023.01) | |

(52) U.S. Cl.
CPC ............ *G06F 16/27* (2019.01); *G06F 16/215* (2019.01); *G06F 16/273* (2019.01);
(Continued)

(58) Field of Classification Search
CPC ...... G06F 16/27; G06F 16/215; G06F 16/273; G06F 16/275; G06F 16/278; G06Q 10/087; G06Q 2220/00
See application file for complete search history.

(56) References Cited

U.S. PATENT DOCUMENTS

2007/0239769 A1*   10/2007   Fazal ................... G06F 16/248
                                                                                                                                   707/999.102

2010/0153382 A1    6/2010   Corp
(Continued)

FOREIGN PATENT DOCUMENTS

| CN | 105701631 B | 12/2019 |
|---|---|---|
| WO | 2018156043 A1 | 8/2018 |
| WO | 2019184210 A1 | 10/2019 |

OTHER PUBLICATIONS

David Bucher, Joern Meissner, Automatic Parameter Configuration for Inventory Management in SAP ERP/APO, 2010, Monograph (Working Paper),/dk/atira/pure/subjectarea/aacsb/disciplinebasedresearch, Lancaster University Management School, Management Science,Mar. 23, 2022, United Kingdom.
(Continued)

*Primary Examiner* — Kris E Mackes
*Assistant Examiner* — Lin M Htay
(74) *Attorney, Agent, or Firm* — Kendal M. Sheets (57) ABSTRACT

This disclosure relates to method and system for managing items in warehouses through distributed ledger. The method includes sending a request from a first warehouse to each of a plurality of warehouses to add an item to an Enterprise Resource Planning (ERP) system associated with each of the plurality of warehouses and to a distributed ledger. For each of the plurality of warehouses, the method further includes checking whether the item exists in an ERP system associated with a warehouse based on the metadata of the item within the request from the first warehouse. The method further includes receiving a response to the request from each of the plurality of warehouses based on the checking. The method further includes managing the item in the ERP system associated with each of the plurality of warehouses and the distributed ledger based on the response received from each of the plurality of warehouses.

12 Claims, 6 Drawing Sheets

(52) U.S. Cl.
CPC .......... *G06F 16/275* (2019.01); *G06F 16/278* (2019.01); *G06Q 10/087* (2013.01); *G06Q 2220/00* (2013.01)

(56) References Cited

U.S. PATENT DOCUMENTS

| | | | |
|---|---|---|---|
| 2019/0026685 A1* | 1/2019 | Chappell | G06Q 10/087 |
| 2021/0133650 A1* | 5/2021 | Cella | G06Q 10/0637 |
| 2021/0334735 A1* | 10/2021 | Meszaros | G06Q 10/06 |

OTHER PUBLICATIONS

Lisa Schwarz, Essential Guide to ERP Inventory Management, Sep. 3, 2020.

\* cited by examiner

METHOD AND SYSTEM FOR MANAGING ITEMS IN WAREHOUSES THROUGH DISTRIBUTED LEDGER

TECHNICAL FIELD

This disclosure relates generally to Stock Keeping Unit (SKU) management, and more particularly to method and system for managing items in warehouses through distributed ledger.

BACKGROUND

Organizations in supply chain today face a huge challenge in form of Stock Keeping Unit (SKU) management which directly impacts profits. Several Master data Management (MDM) based solutions are available for SKU rationalization and reporting. But the MDM process includes certain limitations.

Organizations with multiple warehouses across geographies, and each of the warehouses including corresponding Enterprise Resource Planning (ERP) systems (or other systems/applications with local database). Over time, the repositories grow huge and reports related to an item across warehouses may not be able to identify duplicate items. MDM aids in de-duplicating the items for reporting purposes. However, MDM provides no feedback to the ERP systems which may help the organizations avoid such exercises next time during reporting.

In the present scenario, warehouses have corresponding ERP systems (or other applications to manage items) which are disconnected with each other and same item is referred by a different ID. There is no common item identity that may help identify same items. When an organization takes out data across all warehouses, such items may look completely different from each other and may result in incorrect decision making and reporting. Collating the data related to such items across multiple warehouse becomes increasingly difficult and leads to time and effort wastage.

The conventional techniques fail to provide for streamlining and de-duplicating an item across warehouses to obtain better quality data for analytics and reporting purposes. There is, therefore, a need in the present state of art for techniques to manage items within an SKU across multiple warehouses in an efficient manner.

SUMMARY

In one embodiment, a method for managing items in warehouses through distributed ledger is disclosed. In one example, the method includes sending a request from a first warehouse to each of a plurality of warehouses to add an item to an Enterprise Resource Planning (ERP) system associated with each of the plurality of warehouses and to a distributed ledger. The first warehouse is one of the plurality of warehouses. The request includes a unique identity and metadata assigned by the first warehouse to the item. Each of the plurality of warehouses includes a copy of the distributed ledger. For each of the plurality of warehouses, the method further includes checking whether the item exists in an ERP system associated with a warehouse based on the metadata of the item within the request from the first warehouse. The method further includes receiving a response to the request from each of the plurality of warehouses based on the checking. The response is one of an approval of the request or a rejection of the request. The method further includes managing the item in the ERP system associated with each of the plurality of warehouses and the distributed ledger based on the response received from each of the plurality of warehouses.

In one embodiment, a system for managing items in warehouses through distributed ledger is disclosed. In one example, the system includes a processor and a computer-readable medium communicatively coupled to the processor. The computer-readable medium store processor-executable instructions, which, on execution, cause the processor to send a request from a first warehouse to each of a plurality of warehouses to add an item to an ERP system associated with each of the plurality of warehouses and to a distributed ledger. The first warehouse is one of the plurality of warehouses. The request includes a unique identity and metadata assigned by the first warehouse to the item. Each of the plurality of warehouses includes a copy of the distributed ledger. For each of the plurality of warehouses, the processor-executable instructions, on execution, further cause the processor to check whether the item exists in an ERP system associated with a warehouse based on the metadata of the item within the request from the first warehouse. The processor-executable instructions, on execution, further cause the processor to receive a response to the request from each of the plurality of warehouses based on the checking. The response is one of an approval of the request or a rejection of the request. The processor-executable instructions, on execution, further cause the processor to manage the item in the ERP system associated with each of the plurality of warehouses and the distributed ledger based on the response received from each of the plurality of warehouses.

In one embodiment, a non-transitory computer-readable medium storing computer-executable instructions for managing items in warehouses through distributed ledger is disclosed. In one example, the stored instructions, when executed by a processor, cause the processor to perform operations including sending a request from a first warehouse to each of a plurality of warehouses to add an item to an ERP system associated with each of the plurality of warehouses and to a distributed ledger. The first warehouse is one of the plurality of warehouses. The request includes a unique identity and metadata assigned by the first warehouse to the item. Each of the plurality of warehouses includes a copy of the distributed ledger. For each of the plurality of warehouses, the operations further include checking whether the item exists in an ERP system associated with a warehouse based on the metadata of the item within the request from the first warehouse. The operations further include receiving a response to the request from each of the plurality of warehouses based on the checking. The response is one of an approval of the request or a rejection of the request. The operations further include managing the item in the ERP system associated with each of the plurality of warehouses and the distributed ledger based on the response received from each of the plurality of warehouses.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
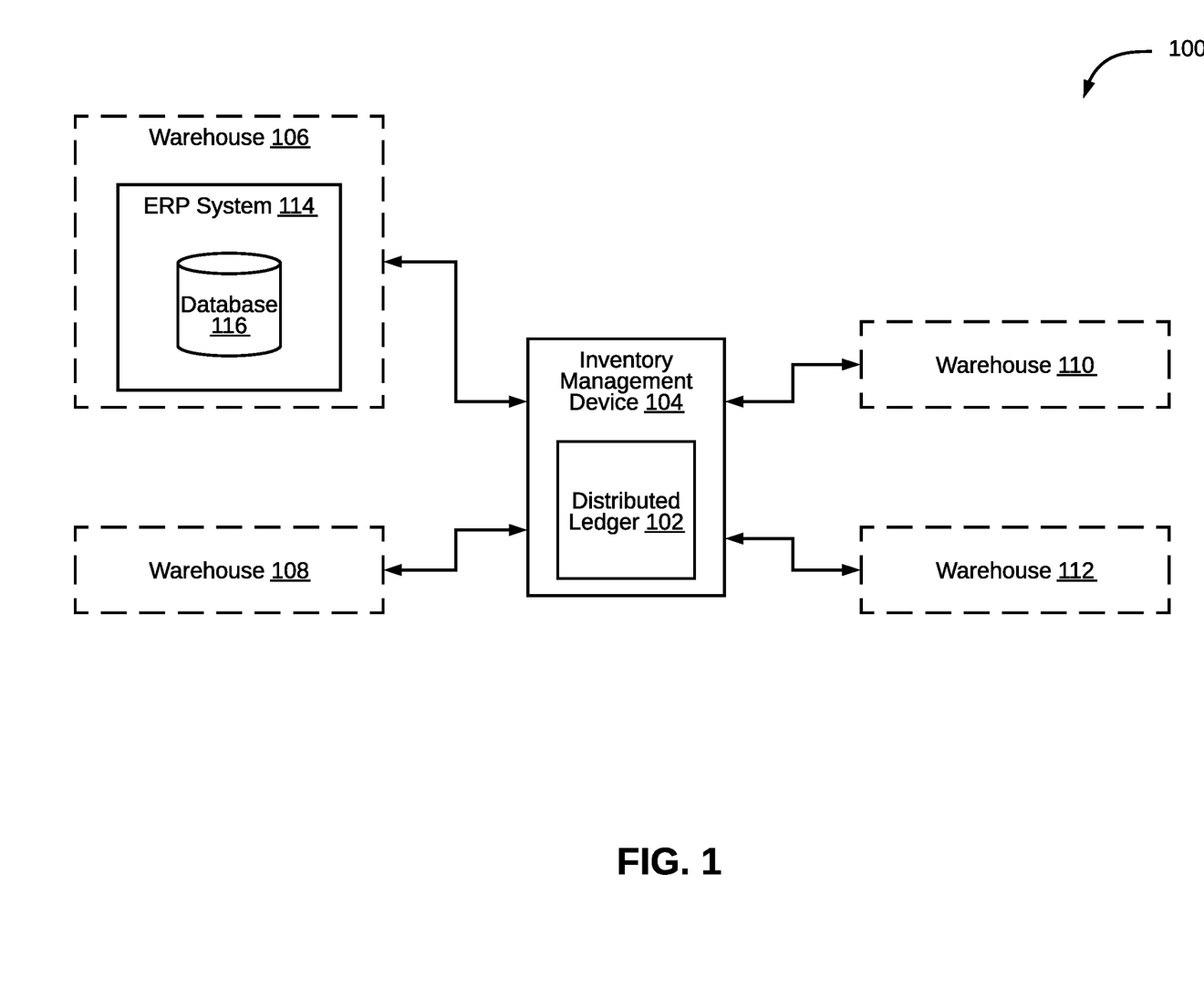
FIG. 1 is a block diagram of an exemplary system for managing items in warehouses through distributed ledger, in accordance with some embodiments.

Referring now to FIG. 1, an exemplary system 100 for managing items in warehouses through distributed ledger 102 is illustrated, in accordance with some embodiments. The distributed ledger 102 may be implemented by an inventory management device 104 (for example, server, desktop, laptop, notebook, netbook, tablet, smartphone, mobile phone, or any other computing device), in accordance with some embodiments of the present disclosure. The inventory management device 104 may manage items in warehouses through the distributed ledger 102 by sending a request to add an item to the distributed ledger 102 from a first warehouse (for example, warehouse 106) to each of a plurality of warehouses (such as, warehouse 108, warehouse 110, and warehouse 112).

The warehouse 106 may include an Enterprise Resource Planning (ERP) system 114. Further, the ERP system 114 may include a database 116. Similarly, each of the plurality of warehouses may include an ERP system (not shown in figure). The inventory management device 104 may send a request from the warehouse 106 to the plurality of warehouses to add an item to the ERP system associated with each of the plurality of warehouses and the distributed ledger 102. It should be noted that, in some embodiments, the inventory management device 104 may receive a response from each of the plurality of warehouses. The response may be an approval or a rejection of the request. Further, the inventory management device 104 manage the item in the distributed ledger 102 based on the response to the request.

Figure 4:
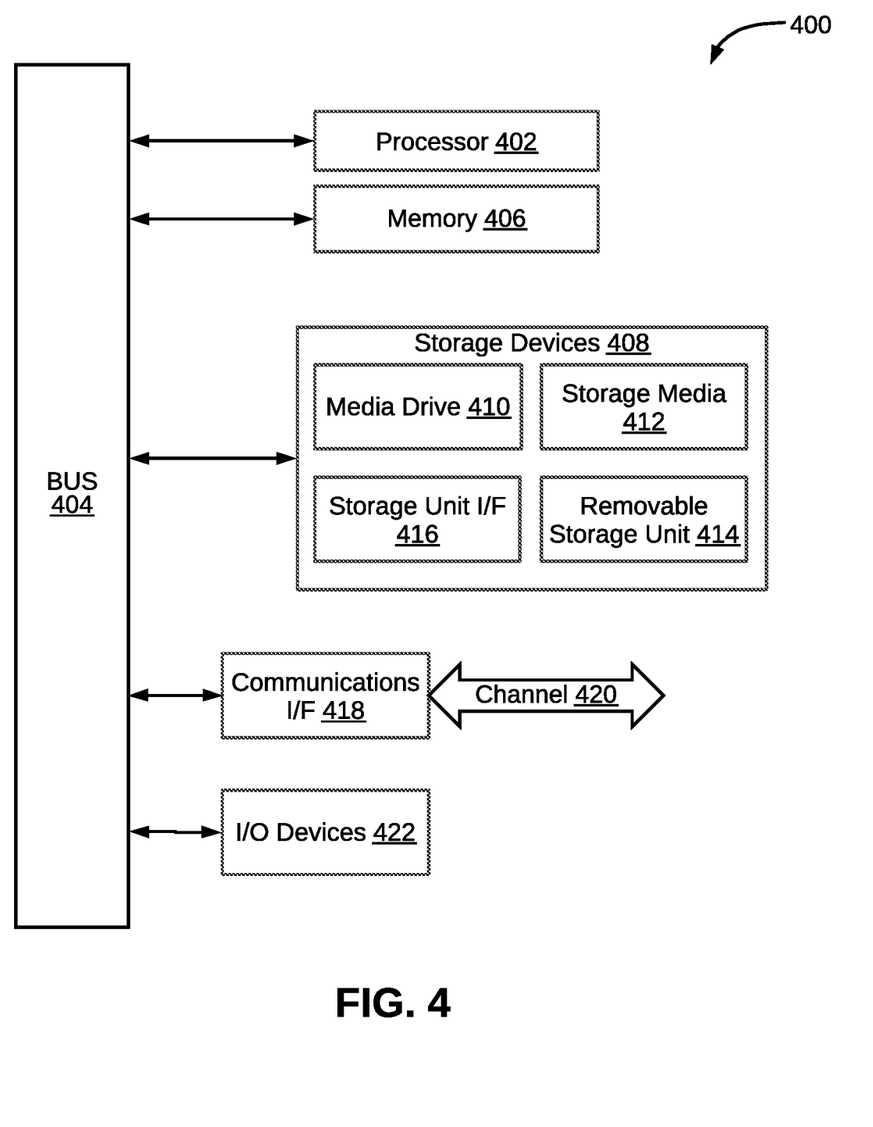
FIG. 4 is a block diagram of an exemplary computer system for implementing embodiments consistent with the present disclosure.

As will be described in greater detail in conjunction with FIGS. 2-4, the inventory management device may send a request from a first warehouse to each of a plurality of warehouses to add an item to an ERP system associated with each of the plurality of warehouses and to a distributed ledger. The first warehouse is one of the plurality of warehouses. The request includes a unique identity and metadata assigned by the first warehouse to the item. Each of the plurality of warehouses includes a copy of the distributed ledger. For each of the plurality of warehouses, the inventory management device may further check whether the item exists in an ERP system associated with a warehouse based on the metadata of the item within the request from the first warehouse. The inventory management device may further receive a response to the request from each of the plurality of warehouses based on the checking, wherein the response is one of an approval of the request or a rejection of the request. The inventory management device may further manage the item in the ERP system associated with each of the plurality of warehouses and the distributed ledger based on the response received from each of the plurality of warehouses.

Figure 2:
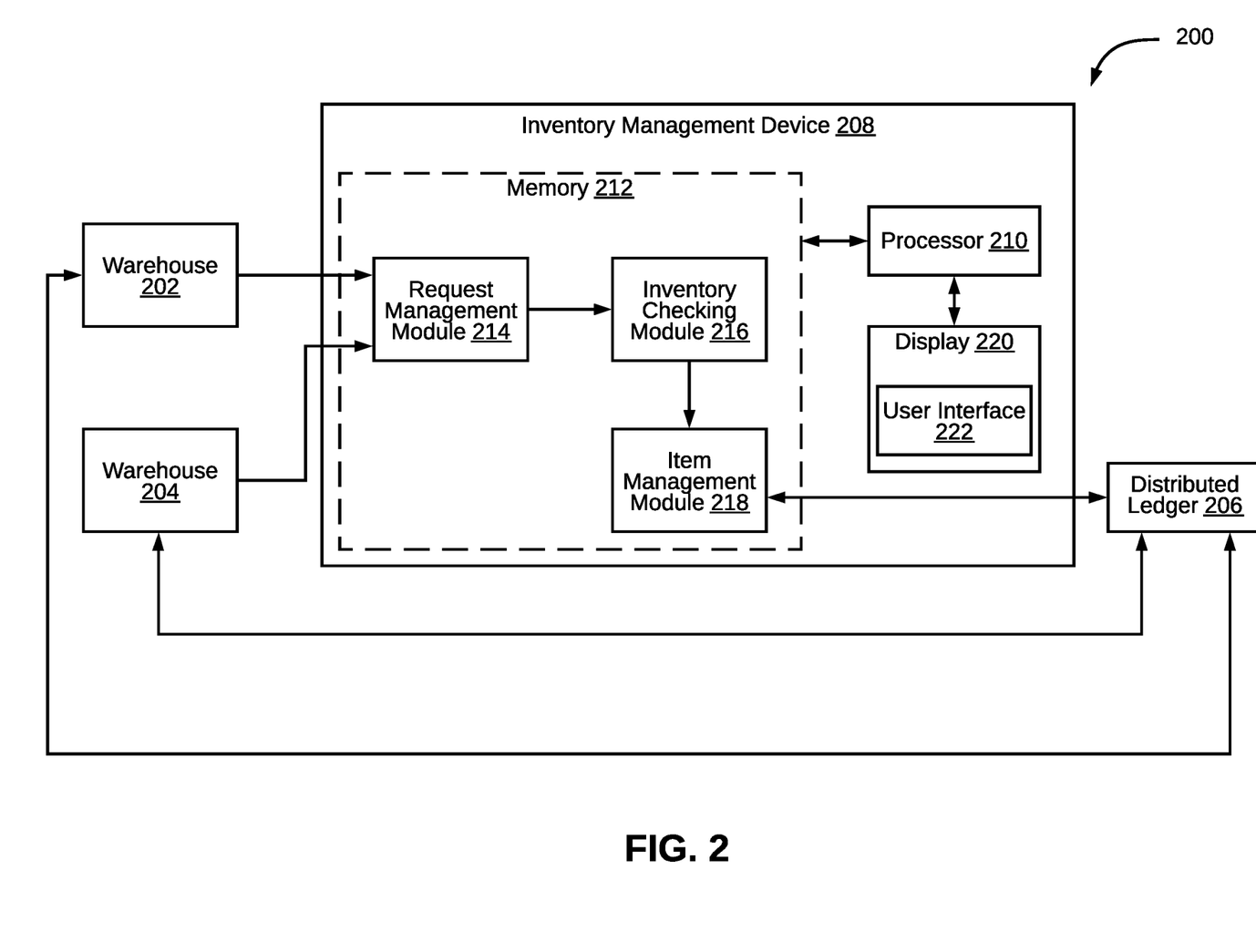
FIG. 2 illustrates a functional block diagram of an exemplary system for managing items in warehouses through distributed ledger, in accordance with some embodiments.
Figure 3A:
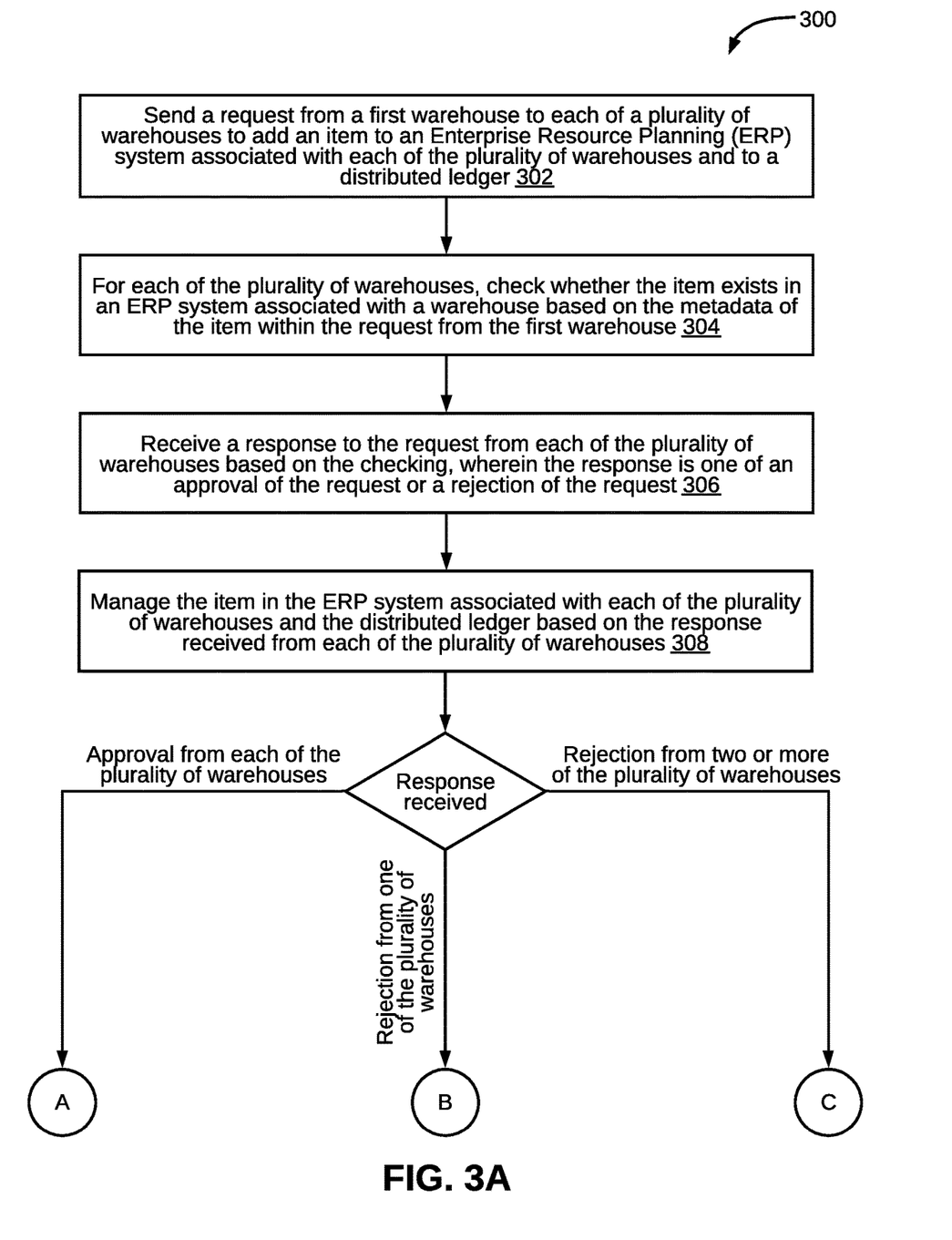
FIGS. 3A-D illustrate a flow diagram of an exemplary process for managing items in warehouses through distributed ledger, in accordance with some embodiments.
Figure 3B:
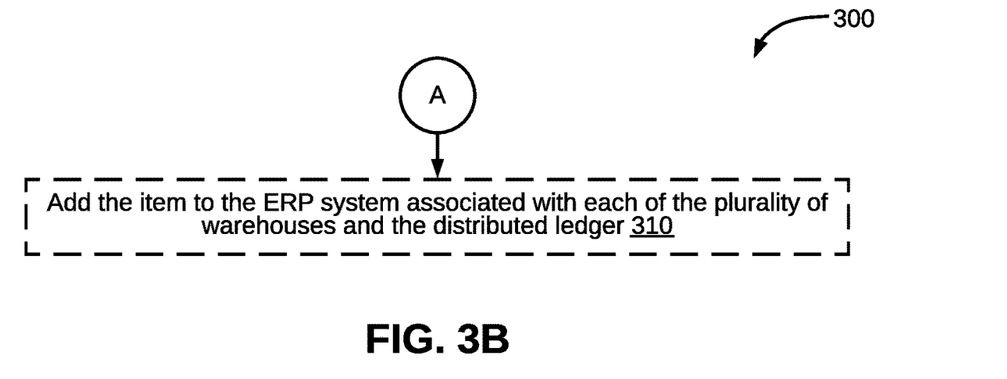
Figure 3C:
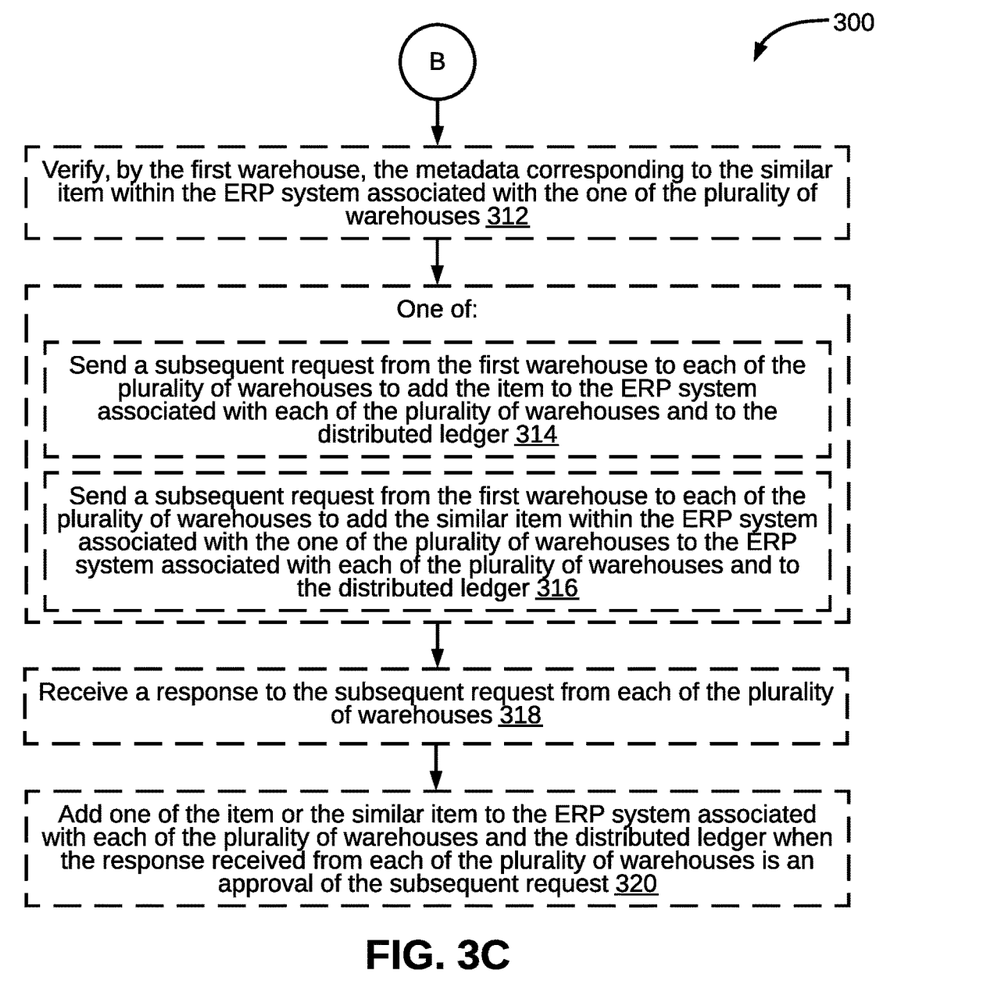
Figure 3D:
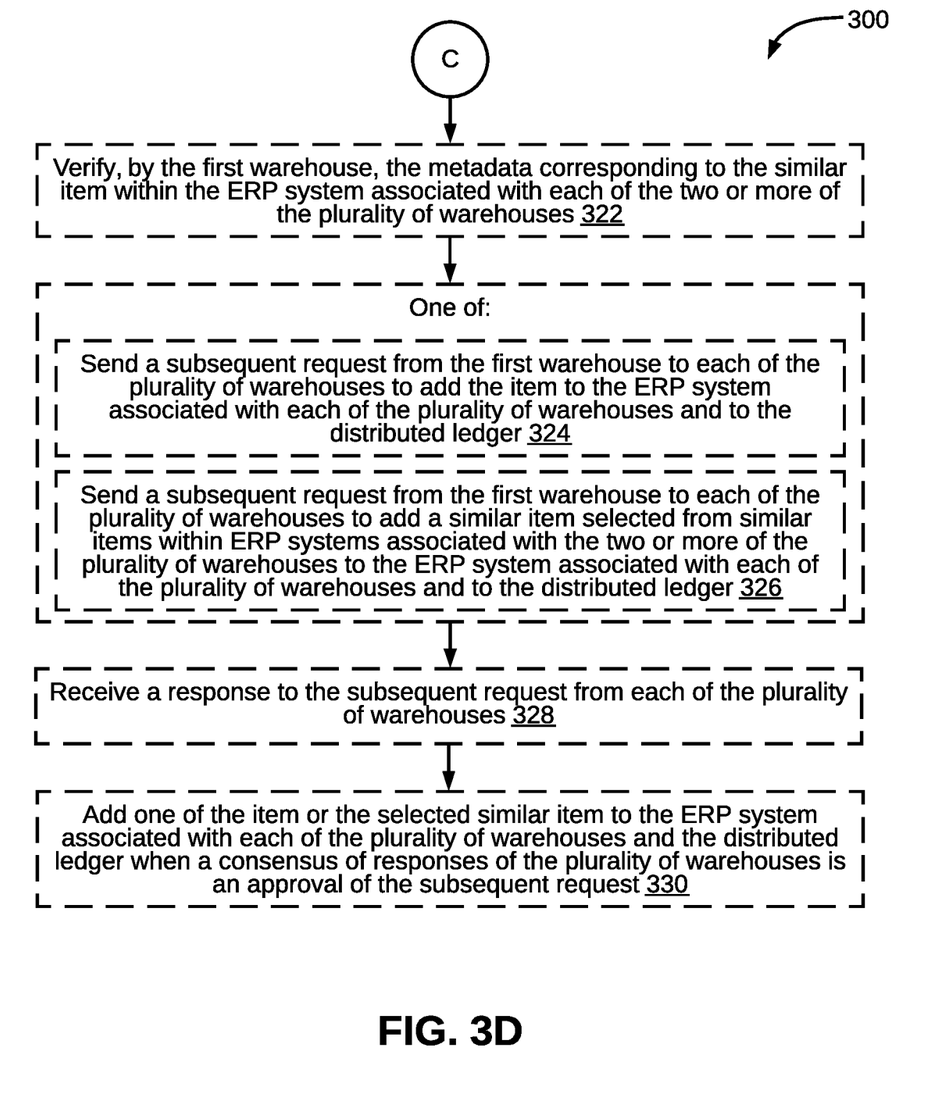

Referring now to FIG. 2, functional block diagram of an exemplary system 200 for managing items in warehouses (such as, warehouse 202 and warehouse 204) through distributed ledger 206 is illustrated, in accordance with some embodiments. Each of the warehouse 202 and the warehouse 204 includes an ERP system and is analogous to the warehouse 106. It may be noted that the system 200 includes additional warehouses which have not been shown in the figure for simplicity of illustration. The system 200 includes an inventory management device 208. In an embodiment, inventory management device 208 is analogous to the inventory management device 104 of the system 100.

In some embodiments, the inventory management device 202 includes one or more processors 210 and a computer-readable medium (for example, a memory 212). The memory 212 includes user data corresponding to a plurality of users. Further, the memory 212 stores instructions that, when executed by the one or more processors 210, cause the one or more processors 210 to manage items in warehouses through the distributed ledger 206, in accordance with aspects of the present disclosure. The memory 212 also stores various data (for example, the ERP system data corresponding to each of the warehouses, distributed ledger data, request to add an item, response to the request, and the like) that may be captured, processed, and/or required by the system 200.

Further, the inventory management device 208 includes, within the memory 212, a request management module 214, an inventory checking module 216, and an item management module 218. In an exemplary scenario, the warehouse 202 sends a request to the inventory management device 208 for adding an item (for example, a ball bearing) to the ERP system of each of the remaining of the plurality of warehouses (including the warehouse 204) and the distributed ledger 206. It may be noted that the request includes a unique identity (for example, 341) and metadata (for example, 35 mm, Steel) assigned by the warehouse 202 to the item. The distributed ledger 206 may be implemented via a smart contract. Each of the plurality of warehouses includes a copy of distributed ledger 206.

The request management module 214 receives the request from the warehouse 204. Further, the request management module 214 sends the request to the inventory checking module 216. The inventory checking module 216, checks whether the item exists in an ERP system associated with each of the plurality of warehouses based on the metadata of the item within the request from the warehouse 202. In an embodiment, an administrator of a warehouse may perform a check and provide a response to the inventory checking module 216 accordingly. Further, the inventory checking module 216 receives a response to the request from each of the plurality of warehouses based on the checking. The response is one of an approval of the request or a rejection of the request.

Further, the inventory checking module 216 sends the response from each of the plurality of warehouses to the item management module 218. The item management module 218 manages the item in the ERP system associated with each of the plurality of warehouses and the distributed ledger based on the response received from each of the plurality of warehouses. When the response received from each of the plurality of warehouses is an approval of the request, the item management module 218 adds the item to the ERP system associated with each of the plurality of warehouses and the distributed ledger 206. In an embodiment, the item management module 218 assigns a unique identity (for example, 01) to the item in the distributed ledger 206. Alternately, the item management module 218 assigns the unique identity (341) and the metadata of the ERP system associated with the warehouse 202 to the item in the distributed ledger 206.

It may be noted that the rejection of the request is received from a warehouse from the plurality of warehouses when a similar item exists within the ERP system associated with the warehouse. The rejection of the request includes a unique identity and metadata of an item within the ERP system associated with the warehouse. When the response received from one of the plurality of warehouses is a rejection of the request and the response received from each of the remaining of the plurality of warehouses is an approval of the request, item management module 218 verifies, by the warehouse 202, the metadata corresponding to the similar item within the ERP system associated with the one of the plurality of warehouses. Further, the item management module 218 may send a subsequent request from the warehouse 202 to each of the plurality of warehouses to add the item to the ERP system associated with each of the plurality of warehouses and to the distributed ledger, or the item management module 218 may send a subsequent request from the warehouse 202 to each of the plurality of warehouses to add the similar item within the ERP system associated with the one of the plurality of warehouses to the ERP system associated with each of the plurality of warehouses and to the distributed ledger. In former scenario, the subsequent request includes additional metadata corresponding to the item and the additional metadata distinguishes the item from the similar item of the one of the plurality of warehouses.

Further, the item management module 218 receives a response to the subsequent request from each of the plurality of warehouses. Further, the item management module 218 adds one of the item or the similar item to the ERP system associated with each of the plurality of warehouses and the distributed ledger when the response received from each of the plurality of warehouses is an approval of the subsequent request. The one of the item or the similar item is added to the ERP system and the distributed ledger along with the unique identity and the metadata within the subsequent request.

When the response received from two or more of the plurality of warehouses is a rejection of the request, the item management module 218 verifies, by the warehouse 202, the metadata corresponding to the similar item within the ERP system associated with each of the two or more of the plurality of warehouses. Further, the item management module may send a subsequent request from the warehouse 202 to each of the plurality of warehouses to add the item to the ERP system associated with each of the plurality of warehouses and to the distributed ledger, or the item management module 218 may send a subsequent request from the warehouse 202 to each of the plurality of warehouses to add a similar item selected from similar items within ERP systems associated with the two or more of the plurality of warehouses to the ERP system associated with each of the plurality of warehouses and to the distributed ledger. In former scenario, the subsequent request includes additional metadata corresponding to the item and the additional metadata distinguishes the item from the similar item of each of the two or more of the plurality of warehouses.

Further, the item management module 218 receives a response to the subsequent request from each of the plurality of warehouses. Further, the item management module 218 adds one of the item or the selected similar item to the ERP system associated with each of the plurality of warehouses and the distributed ledger when a consensus of responses of the plurality of warehouses is an approval of the subsequent request. The one of the item or the selected similar item is added to the ERP system and the distributed ledger along with the unique identity and the metadata within the subsequent request. The consensus includes a majority of the plurality of warehouses. Further, when the consensus is not achieved, the item management module 218 adds one of the item or the selected similar item to the ERP system based on the response of the warehouse 202. Further, the item management module 218 updates the ERP system associated with each of the plurality of warehouses with the unique identity and the metadata corresponding to the item within the distributed ledger through the copy of the distributed ledger.

The system 200 further includes a display 220. The system 200 interacts with a user via a user interface 222 accessible via the display 220. In some embodiments, the inventory management device 202 interacts with the one or more external devices over a communication network for sending or receiving various data. The external devices include, but is not limited to, a remote server, a digital device, or another computing system.

It should be noted that all such aforementioned modules 210-222 may be represented as a single module or a combination of different modules. Further, as will be appreciated by those skilled in the art, each of the modules 210-222 may reside, in whole or in parts, on one device or multiple devices in communication with each other. In some embodiments, each of the modules 210-222 may be implemented as dedicated hardware circuit comprising custom application-specific integrated circuit (ASIC) or gate arrays, off-the-shelf semiconductors such as logic chips, transistors, or other discrete components. Each of the modules 210-222 may also be implemented in a programmable hardware device such as a field programmable gate array (FPGA), programmable array logic, programmable logic device, and so forth. Alternatively, each of the modules 210-222 may be implemented in software for execution by various types of processors (e.g., processor 210). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing items in warehouses through distributed ledger. For example, the exemplary system 200 and the associated inventory management device 208 may manage items in warehouses through distributed ledger by the processes discussed herein.

In particular, as will be appreciated by those of ordinary skill in the art, control logic and/or automated routines for performing the techniques and steps described herein may be implemented by the system 200 and the inventory management device 208 either by hardware, software, or combinations of hardware and software. For example, suitable code may be accessed and executed by the one or more processors on the system 200 to perform some or all of the techniques described herein. Similarly, application specific integrated circuits (ASICs) configured to perform some or all of the processes described herein may be included in the one or more processors on the system 200.

Referring now to FIGS. 3A-D, an exemplary process 300 for managing items in warehouses (such as, warehouses 106, 108, 110, and 112) through distributed ledger (such as, the distributed ledger 102) is depicted via a flowchart, in accordance with some embodiments. In an embodiment, the process 300 may be implemented by the inventory management device 208 of the system 200. The process 300 includes sending a request from a first warehouse (for example, warehouse 106) to each of a plurality of warehouses (for example, warehouses 108, 110, and 112) to add an item to an ERP system associated with each of the plurality of warehouses and to a distributed ledger, at step 302. The first warehouse is one of the plurality of warehouses. The request includes a unique identity and metadata assigned by the first warehouse to the item. Each of the plurality of warehouses includes a copy of the distributed ledger. Further, for each of the plurality of warehouses, the process 300 includes checking whether the item exists in an ERP system associated with a warehouse based on the metadata of the item within the request from the first warehouse, at step 304.

Further, the process 300 includes receiving a response to the request from each of the plurality of warehouses based on the checking, at step 306. It should be noted that the response is one of an approval of the request or a rejection of the request. Further, the process 300 includes managing the item in the ERP system associated with each of the plurality of warehouses and the distributed ledger based on the response received from each of the plurality of warehouses, at step 308. By way of an example, the warehouse 106 sends a request to the request management module 214 to add an item (for example, a ball bearing) to the distributed ledger 206. The request is sent to each of the warehouses 108, 110, and 112. Each of the warehouses 108, 110, and 112 performs a check in the ERP system to determine whether an item similar to the item in the request is present. Based on the check, each of the warehouses 108, 110, and 112 sends a response to the inventory checking module 216.

Further, based on the response received from each of the plurality of warehouses, the process 300 may be implemented in at least three scenarios. When the response received is an approval from each of the plurality of warehouses, the process 300 includes adding the item to the ERP system associated with each of the plurality of warehouses and the distributed ledger, at step 310. The item is added to the ERP system associated with each of the plurality of warehouses and the distributed ledger along with the unique identity and the metadata within the request. Alternately, the item is added to the ERP system associated with each of the plurality of warehouses and the distributed ledger along with the unique identity generated by the inventory management device and the metadata within the request. In continuation of the example above, when the response received from each of the warehouses 108, 110, and 112 is an approval of the request, the item management module 218 adds the item to the distributed ledger 206.

It may be noted that the rejection of the request is received from a warehouse from the plurality of warehouses when a similar item exists within the ERP system associated with the warehouse. It may also be noted that the rejection of the request includes a unique identity and metadata of an item within the ERP system associated with the warehouse. When the response received is a rejection from one of the plurality of warehouses and an approval from each of remaining of the plurality of warehouses, the process 300 includes verifying, by the first warehouse, the metadata corresponding to the similar item within the ERP system associated with the one of the plurality of warehouses, at step 312.

Further, the process 300 includes sending a subsequent request from the first warehouse to each of the plurality of warehouses to add the item to the ERP system associated with each of the plurality of warehouses and to the distributed ledger, at step 314. The subsequent request includes additional metadata corresponding to the item, and wherein the additional metadata distinguishes the item from the similar item of the one of the plurality of warehouses. Further, the process 300 includes sending a subsequent request from the first warehouse to each of the plurality of warehouses to add the similar item within the ERP system associated with the one of the plurality of warehouses to the ERP system associated with each of the plurality of warehouses and to the distributed ledger, at step 316. It should be noted that the process 300 may execute one of the step 314 or the step 316.

Further, the process 300 includes receiving a response to the subsequent request from each of the plurality of warehouses, at step 318. Further, the process 300 includes adding one of the item or the similar item to the ERP system associated with each of the plurality of warehouses and the distributed ledger when the response received from each of the plurality of warehouses is an approval of the subsequent request, at step 320. The one of the item or the similar item is added to the ERP system and the distributed ledger along with the unique identity and the metadata within the subsequent request. In continuation of the example above, when one of the warehouses 108, 110, and 112 rejects the request, the response to the request is sent to the inventory checking module 216. The response includes a unique identity and metadata of an item within the ERP system associated with the one of the warehouses 108, 110, and 112. Further, the warehouse 106 verifies the unique identity and the metadata of the item within the ERP system associated with the one of the warehouses 108, 110, and 112. When the warehouse 106 is able to distinguish the response item from the requested item, the warehouse 106 sends a subsequent request to each of the warehouses 108, 110, and 112 to add the item to the ERP system associated with each of the warehouses 108, 110, and 112 and to the distributed ledger 206. The subsequent request includes additional metadata corresponding to the item. The additional metadata distinguishes the item from the similar item of the one of the warehouses 108, 110, and 112. When the warehouse 106 is unable to distinguish the response item from the requested item, the warehouse 106 sends a subsequent request to each of the warehouses to add the similar item within the ERP system associated with the one of the warehouses 108, 110, and 112 to the ERP system associated with each of the warehouses 108, 110, and 112 and to the distributed ledger 206. Further, when each of the warehouses 108, 110, and 112 approves the subsequent request, the item is added to the distributed ledger 206 by the item management module 218.

When the response received is a rejection from two or more of the plurality of warehouses, the process 300 includes verifying, by the first warehouse, the metadata corresponding to the similar item within the ERP system associated with each of the two or more of the plurality of warehouses, at step 322. Further, the process 300 includes sending a subsequent request from the first warehouse to each of the plurality of warehouses to add the item to the ERP system associated with each of the plurality of warehouses and to the distributed ledger, at step 324. The subsequent request includes additional metadata corresponding to the item. The additional metadata distinguishes the item from the similar item of each of the two or more of the plurality of warehouses. Further, the process 300 includes sending a subsequent request from the first warehouse to each of the plurality of warehouses to add a similar item selected from similar items within ERP systems associated with the two or more of the plurality of warehouses to the ERP system associated with each of the plurality of warehouses and to the distributed ledger, at step 326. It should be noted that the process 300 may execute one of the step 324 or the step 326.

Further, the process 300 includes receiving a response to the subsequent request from each of the plurality of warehouses, at step 328. Further, the process 300 includes adding one of the item or the selected similar item to the ERP system associated with each of the plurality of warehouses and the distributed ledger when a consensus of responses of the plurality of warehouses is an approval of the subsequent request, at step 330. The one of the item or the selected similar item is added to the ERP system and the distributed ledger along with the unique identity and the metadata within the subsequent request. The consensus includes a majority of the plurality of warehouses. In continuation of the example above, when two or more of the warehouses 108, 110, and 112 reject the request, the response to the request is sent to the inventory checking module 216. The response includes a unique identity and metadata of a similar item within the ERP system associated with each of the two or more of the warehouses 108, 110, and 112. Further, the warehouse 106 verifies the unique identity and the metadata of the similar item within the ERP system associated with each of the two or more of the warehouses 108, 110, and 112. When the warehouse 106 is able to distinguish the response item from each of the similar items, the warehouse 106 sends a subsequent request to each of the warehouses 108, 110, and 112 to add the item to the ERP system associated with each of the warehouses 108, 110, and 112 and to the distributed ledger 206. The subsequent request includes additional metadata corresponding to the item. The additional metadata distinguishes the item from the similar item of each of the two or more of the warehouses 108, 110, and 112. When the warehouse 106 is unable to distinguish the response item from at least one of the similar items, the warehouse 106 sends a subsequent request to each of the warehouses 108, 110, and 112 to add a similar item selected from the similar items within the ERP system associated with the two or more of the warehouses 108, 110, and 112 to the ERP system associated with each of the warehouses 108, 110, and 112 and to the distributed ledger 206. Further, when each of the warehouses 108, 110, and 112 approves the subsequent request, the item is added to the distributed ledger 206 by the item management module 218. Alternately, a consensus of responses of the warehouses 108, 110, and 112 is considered when more than one items with similar metadata are requested to be added to the distributed ledger. In an exemplary scenario, when a consensus of responses is not achieved, the vote of the warehouse 106 may be considered as a final decision. It may be noted that blockchain inherently is a secure technology and all back and forth transactions are protected by identity and access management and encryption.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer. Referring now to FIG. 4, an exemplary computing system 400 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 400 may represent, for example, a user device such as a desktop, a laptop, a mobile phone, personal entertainment device, DVR, and so on, or any other type of special or general-purpose computing device as may be desirable or appropriate for a given application or environment. The computing system 400 may include one or more processors, such as a processor 402 that may be implemented using a general or special purpose processing engine such as, for example, a microprocessor, microcontroller or other control logic. In this example, the processor 402 is connected to a bus 404 or other communication medium. In some embodiments, the processor 402 may be an Artificial Intelligence (AI) processor, which may be implemented as a Tensor Processing Unit (TPU), or a graphical processor unit, or a custom programmable solution Field-Programmable Gate Array (FPGA).

The computing system 400 may also include a memory 406 (main memory), for example, Random Access Memory (RAM) or other dynamic memory, for storing information and instructions to be executed by the processor 402. The memory 406 also may be used for storing temporary variables or other intermediate information during execution of instructions to be executed by the processor 402. The computing system 400 may likewise include a read only memory ("ROM") or other static storage device coupled to bus 404 for storing static information and instructions for the processor 402.

The computing system 400 may also include a storage devices 408, which may include, for example, a media drive 410 and a removable storage interface. The media drive 410 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 412 may include, for example, a hard disk, magnetic tape, flash drive, or other fixed or removable medium that is read by and written to by the media drive 410. As these examples illustrate, the storage media 412 may include a computer-readable storage medium having stored therein particular computer software or data.

In alternative embodiments, the storage devices 408 may include other similar instrumentalities for allowing computer programs or other instructions or data to be loaded into the computing system 400. Such instrumentalities may include, for example, a removable storage unit 414 and a storage unit interface 416, such as a program cartridge and cartridge interface, a removable memory (for example, a flash memory or other removable memory module) and memory slot, and other removable storage units and interfaces that allow software and data to be transferred from the removable storage unit 414 to the computing system 400.

The computing system 400 may also include a communications interface 418. The communications interface 418 may be used to allow software and data to be transferred between the computing system 400 and external devices. Examples of the communications interface 418 may include a network interface (such as an Ethernet or other NIC card), a communications port (such as for example, a USB port, a micro USB port), Near field Communication (NFC), etc. Software and data transferred via the communications interface 418 are in the form of signals which may be electronic, electromagnetic, optical, or other signals capable of being received by the communications interface 418. These signals are provided to the communications interface 418 via a channel 420. The channel 420 may carry signals and may be implemented using a wireless medium, wire or cable, fiber optics, or other communications medium. Some examples of the channel 420 may include a phone line, a cellular phone link, an RF link, a Bluetooth link, a network interface, a local or wide area network, and other communications channels.

The computing system 400 may further include Input/Output (I/O) devices 422. Examples may include, but are not limited to a display, keypad, microphone, audio speakers, vibrating motor, LED lights, etc. The I/O devices 422 may receive input from a user and also display an output of the computation performed by the processor 402. In this document, the terms "computer program product" and "computer-readable medium" may be used generally to refer to media such as, for example, the memory 406, the storage devices 408, the removable storage unit 414, or signal(s) on the channel 420. These and other forms of computer-readable media may be involved in providing one or more sequences of one or more instructions to the processor 402 for execution. Such instructions, generally referred to as "computer program code" (which may be grouped in the form of computer programs or other groupings), when executed, enable the computing system 400 to perform features or functions of embodiments of the present invention.

In an embodiment where the elements are implemented using software, the software may be stored in a computer-readable medium and loaded into the computing system 400 using, for example, the removable storage unit 414, the media drive 410 or the communications interface 418. The control logic (in this example, software instructions or computer program code), when executed by the processor 402, causes the processor 402 to perform the functions of the invention as described herein.

Thus, the disclosed method and system try to overcome the technical problem of managing items in warehouses through distributed ledger. The method and system provide a cleaner item master table for better collaboration across warehouses. Further, the method and system enforce unique item identification across various ERP systems for same company by creating a report across ERPs will not need pre-processing the data every time. Further, the method and system help organizations take better decisions using better quality data by maintaining a duplicate item in inventory cost, company money, and overheads such as quality checks and threshold levels, etc. Further, the method and system provide for better reporting and insight generation using streamlined data. Further, the method and system automate the item identification function using smart contract and SKU rationalization. Further, the method and system make distributed data and transactions visible across warehouses in a multi-warehouse system.

As will be appreciated by those skilled in the art, the techniques described in the various embodiments discussed above are not routine, or conventional, or well understood in the art. The techniques discussed above provide for managing items in warehouses through distributed ledger. The techniques use blockchain for secure and transparent transactions through a distributed ledger-based approach. The techniques first send a request from a first warehouse to each of a plurality of warehouses to add an item to an ERP system associated with each of the plurality of warehouses and to a distributed ledger. The first warehouse is one of the plurality of warehouses. The request includes a unique identity and metadata assigned by the first warehouse to the item. Each of the plurality of warehouses includes a copy of the distributed ledger. For each of the plurality of warehouses, the techniques then check whether the item exists in an ERP system associated with a warehouse based on the metadata of the item within the request from the first warehouse. The techniques then receive a response to the request from each of the plurality of warehouses based on the checking. The response is one of an approval of the request or a rejection of the request. The techniques then manage the item in the ERP system associated with each of the plurality of warehouses and the distributed ledger based on the response received from each of the plurality of warehouses.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for managing items in warehouses through distributed ledger. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing items in warehouses through distributed ledger, the method comprising:

sending, by an inventory management device, a request from a first warehouse to each of a plurality of warehouses to add an item to an Enterprise Resource Planning (ERP) system associated with each of the plurality of warehouses and to a distributed ledger, wherein the first warehouse is one of the plurality of warehouses, wherein the request comprises a unique identity and metadata assigned by the first warehouse to the item, and wherein each of the plurality of warehouses comprises a copy of the distributed ledger;

for each of the plurality of warehouses, checking, by the inventory management device, whether the item exists in an ERP system associated with a warehouse based on the metadata of the item within the request from the first warehouse;

receiving, by the inventory management device, a response to the request from each of the plurality of warehouses based on the checking, wherein the response is one of an approval of the request or a rejection of the request and wherein the approval of the request is received from a warehouse when a similar item does not exist within the ERP system associated with the warehouse and the rejection of the request is received when a similar item exists within the ERP system associated with the warehouse, and wherein the rejection of the request comprises a unique identity and metadata of the similar item within the ERP system associated with the warehouse;

managing, by the inventory management device, the item in the ERP system associated with each of the plurality of warehouses and the distributed ledger based on the response received from each of the plurality of warehouses, wherein managing the item, when the response received from two or more of the plurality of warehouses is a rejection of the request, further comprises:

verifying, by the first warehouse, the metadata corresponding to the similar items within the ERP systems associated with each of the two or more of the plurality of warehouses;

sending a subsequent request, from the first warehouse to each of the plurality of warehouses, to add the item to the ERP system associated with each of the plurality of warehouses and to the distributed ledger, wherein the subsequent request comprises additional metadata corresponding to the item, and wherein the additional metadata distinguishes the item from the similar items of each of the two or more of the plurality of warehouses;

adding the item to the ERP system associated with each of the plurality of warehouses and the distributed ledger when the response received from each of the plurality of warehouses is an approval of the subsequent request, wherein the item is added to the ERP system and the distributed ledger along with the unique identity and the metadata within the subsequent request;

adding the item to the ERP system associated with each of the plurality of warehouses and the distributed ledger, based on a consensus of votes received from two or more of the plurality of warehouses, when the response received from the two or more of the plurality of warehouses is a rejection of the subsequent request, wherein the votes are polled to choose one of the two or more unique identities and the metadata of the similar item;

updating, by the inventory management device, the ERP system associated with each of the plurality of warehouses with the unique identity and the metadata corresponding to the item within the distributed ledger through the copy of the distributed ledger.

2. The method of claim 1, wherein managing the item in the ERP system associated with each of the plurality of warehouses and the distributed ledger further comprises adding the item to the ERP system associated with each of the plurality of warehouses and the distributed ledger when the response received from each of the plurality of warehouses is an approval of the request, wherein the item is added to the ERP system and the distributed ledger along with the unique identity and the metadata within the request.

3. The method of claim 1, wherein managing the item in the ERP system associated with each of the plurality of warehouses and the distributed ledger when the response received from one of the plurality of warehouses is a rejection of the request further comprises:

verifying, by the first warehouse, the metadata corresponding to the similar item within the ERP system associated with the one of the plurality of warehouses;

sending a subsequent request from the first warehouse to each of the plurality of warehouses to add the item to the ERP system associated with each of the plurality of warehouses and to the distributed ledger, wherein the subsequent request comprises additional metadata corresponding to the item, and wherein the additional metadata distinguish distinguishes the item from the similar item of the one of the plurality of warehouses;

adding the item to the ERP system associated with each of the plurality of warehouses and the distributed ledger when the response received from each of the plurality of warehouses is an approval of the subsequent request, wherein the item is added to the ERP system and the distributed ledger along with the unique identity and the metadata within the subsequent request;

adding the item to the ERP system associated with each of the plurality of warehouses and the distributed ledger, with the unique identity and metadata of the similar item, when the response received from the one of the plurality of warehouses is a rejection of the subsequent request.

4. The method of claim 1, wherein the vote of the first warehouse is considered when the consensus is not achieved.

5. A system for managing items in warehouses through distributed ledger, the system comprising: a processor; and
a memory communicatively coupled to the processor, wherein the memory stores processor instructions, which when executed by the processor, cause the processor to:
send a request from a first warehouse to each of a plurality of warehouses to add an item to an Enterprise Resource Planning (ERP) system associated with each of the plurality of warehouses and to a distributed ledger, wherein the first warehouse is one of the plurality of warehouses, wherein the request comprises a unique identity and metadata assigned by the first warehouse to the item, and wherein each of the plurality of warehouses comprises a copy of the distributed ledger;
for each of the plurality of warehouses, check whether the item exists in an ERP system associated with a warehouse based on the metadata of the item within the request from the first warehouse;
receive a response to the request from each of the plurality of warehouses based on the checking, wherein the response is one of an approval of the request or a rejection of the request, and wherein the approval of the request is received from a warehouse when a similar item does not exist within the ERP system associated with the warehouse and the rejection of the request is received when a similar item exists within the ERP system associated with the warehouse, and wherein the rejection of the request comprises a unique identity and metadata of the similar item within the ERP system associated with the warehouse;
manage the item in the ERP system associated with each of the plurality of warehouses and the distributed ledger based on the response received from each of the plurality of warehouses, wherein managing the item, when the response received from two or more of the plurality of warehouses is a rejection of the request, further comprises:
verifying, by the first warehouse, the metadata corresponding to the similar items within the ERP systems associated with each of the two or more of the plurality of warehouses;
sending a subsequent request, from the first warehouse to each of the plurality of warehouses, to add the item to the ERP system associated with each of the plurality of warehouses and to the distributed ledger, wherein the subsequent request comprises additional metadata corresponding to the item, and wherein the additional metadata distinguishes the item from the similar items of each of the two or more of the plurality of warehouses;
adding the item to the ERP system associated with each of the plurality of warehouses and the distributed ledger when the response received from each of the plurality of warehouses is an approval of the subsequent request, wherein the item is added to the ERP system and the distributed ledger along with the unique identity and the metadata within the subsequent request;
adding the item to the ERP system associated with each of the plurality of warehouses and the distributed ledger, based on a consensus of votes received from the two or more of the plurality of warehouses, when the response received from two or more of the plurality of warehouses is a rejection of the subsequent request, wherein the votes are polled to choose one of the two or more unique identities and the metadata of the similar item;
updating, by the inventory management device, the ERP system associated with each of the plurality of warehouses with the unique identity and the metadata corresponding to the item within the distributed ledger through the copy of the distributed ledger.

6. The system of claim 5, wherein to manage the item in the ERP system associated with each of the plurality of warehouses and the distributed ledger, the processor instructions, on execution, further cause the processor to add the item to the ERP system associated with each of the plurality of warehouses and the distributed ledger when the response received from each of the plurality of warehouses is an approval of the request, wherein the item is added to the ERP system and the distributed ledger along with the unique identity and the metadata within the request.

7. The system of claim 5, wherein to manage the item in the ERP system associated with each of the plurality of warehouses and the distributed ledger, when the response received from one of the plurality of warehouses is a rejection of the request, the processor instructions, on execution, further cause the processor to:
verify, by the first warehouse, the metadata corresponding to the similar item within the ERP system associated with the one of the plurality of warehouses;
send a subsequent request from the first warehouse to each of the plurality of warehouses to add the item to the ERP system associated with each of the plurality of warehouses and to the distributed ledger, wherein the subsequent request comprises additional metadata corresponding to the item, and wherein the additional metadata distinguishes the item from the similar item of the one of the plurality of warehouses;
add the item to the ERP system associated with each of the plurality of warehouses and the distributed ledger when the response received from each of the plurality of warehouses is an approval of the subsequent request, wherein the one of the item or the similar item is added to the ERP system and the distributed ledger along with the unique identity and the metadata within the subsequent request;
add the item to the ERP system associated with each of the plurality of warehouses and the distributed ledger, with the unique identity and metadata of the similar item, when the response received from the one of the plurality of warehouses is a rejection of the subsequent request.

8. The system of claim 5, wherein the vote of the first warehouse is considered when the consensus is not achieved.

9. A non-transitory computer-readable medium storing computer-executable instructions for managing items in warehouses through distributed ledger, the computer-executable instructions configured for:
sending, by an inventory management device, a request from a first warehouse to each of a plurality of warehouses to add an item to an Enterprise Resource Planning (ERP) system associated with each of the plurality of warehouses and to a distributed ledger, wherein the first warehouse is one of the plurality of warehouses, wherein the request comprises a unique identity and metadata assigned by the first warehouse to the item, and wherein each of the plurality of warehouses comprises a copy of the distributed ledger;

for each of the plurality of warehouses, checking, by the inventory management device, whether the item exists in an ERP system associated with a warehouse based on the metadata of the item within the request from the first warehouse;

receiving, by the inventory management device, a response to the request from each of the plurality of warehouses based on the checking, wherein the response is one of an approval of the request or a rejection of the request, and wherein the approval of the request is received from a warehouse when a similar item does not exist within the ERP system associated with the warehouse and the rejection of the request is received when a similar item exists within the ERP system associated with the warehouse, and wherein the rejection of the request comprises a unique identity and metadata of the similar item within the ERP system associated with the warehouse;

managing, by the inventory management device, the item in the ERP system associated with each of the plurality of warehouses and the distributed ledger based on the response received from each of the plurality of warehouses, wherein managing the item, when the response received from two or more of the plurality of warehouses is a rejection of the request, further comprises:

verifying, by the first warehouse, the metadata corresponding to the similar item within the ERP system associated with each of the two or more of the plurality of warehouses;

sending a subsequent request from the first warehouse to each of the plurality of warehouses to add the item to the ERP system associated with each of the plurality of warehouses and to the distributed ledger, wherein the subsequent request comprises additional metadata corresponding to the item, and wherein the additional metadata distinguishes the item from the similar item of each of the two or more of the plurality of warehouses;

adding the item to the ERP system associated with each of the plurality of warehouses and the distributed ledger when the response received from each of the plurality of warehouses is an approval of the subsequent request, wherein the item is added to the ERP system and the distributed ledger along with the unique identity and the metadata within the subsequent request;

adding the item to the ERP system associated with each of the plurality of warehouses and the distributed ledger, based on a consensus of votes received from the two or more of the plurality of warehouses, when the response received from two or more of the plurality of warehouses is a rejection of the subsequent request, wherein the votes are polled to choose one of the two or more unique identities and the metadata of the similar item; and updating, by the inventory management device, the ERP system associated with each of the plurality of warehouses with the unique identity and the metadata corresponding to the item within the distributed ledger through the copy of the distributed ledger.

10. The non-transitory computer-readable medium of claim 9, wherein to manage the item in the ERP system associated with each of the plurality of warehouses and the distributed ledger, the computer-executable instructions are further configured for adding the item to the ERP system associated with each of the plurality of warehouses and the distributed ledger when the response received from each of the plurality of warehouses is an approval of the request, wherein the item is added to the ERP system and the distributed ledger along with the unique identity and the metadata within the request.

11. The non-transitory computer-readable medium of claim 9, wherein to manage the item in the ERP system associated with each of the plurality of warehouses and the distributed ledger when the response received from one of the plurality of warehouses is a rejection of the request, the computer-executable instructions are further configured for:

verifying, by the first warehouse, the metadata corresponding to the similar item within the ERP system associated with the one of the plurality of warehouses;

sending a subsequent request from the first warehouse to each of the plurality of warehouses to add the item to the ERP system associated with each of the plurality of warehouses and to the distributed ledger, wherein the subsequent request comprises additional metadata corresponding to the item, and wherein the additional metadata distinguishes the item from the similar item of the one of the plurality of warehouses;

adding the item to the ERP system associated with each of the plurality of warehouses and the distributed ledger when the response received from each of the plurality of warehouses is an approval of the subsequent request, wherein the item is added to the ERP system and the distributed ledger along with the unique identity and the metadata within the subsequent request;

adding the item to the ERP system associated with each of the plurality of warehouses and the distributed ledger, with the unique identity and metadata of the similar item, when the response received from the one of the plurality of warehouses is a rejection of the subsequent request.

12. The non-transitory computer-readable medium of claim 9, wherein the vote of the first warehouse is considered when the consensus is not achieved.

* * * * *